Patented Dec. 8, 1936

2,063,596

UNITED STATES PATENT OFFICE 2,063,596

THERMAL TREATMENT OF CARBON COMPOUNDS

Paul Feiler, Ludwigshafen-on-the-Rhine, Germany, assignor to I. G. Farbenindustrie Aktiengesellschaft, Frankfort-on-the-Main, Germany No Drawing. Application February 13, 1933, Serial No. 656,630. In Germany February 19, 1932

2 Claims. (Cl. 196—133)

The present invention relates to improvements in the thermal treatment of carbon compounds and in particular of hydrocarbons.

It has already been proposed to carry out the thermal treatment of materials comprising hydrocarbons such as the cracking of oils and tars, the aromatization of aliphatic oils, the destructive hydrogenation of carbonaceous substances of the nature of oils, tars and coals and their distillation and conversion products, and the polymerization of unsaturated hydrocarbons, such as ethylene and its homologues and acetylene, in apparatus the hot parts of which consist of, or are coated with, materials which prevent or strongly suppress the deposition of carbon. A whole series of substances has been suggested for this purpose, as for example elements of the 4th group of the periodic system, such as silicon, carbon in the form of graphite, tin and lead and also chromium and the like. It has also been proposed for the purpose of preventing the deposition of carbon to supply the metallic parts of the apparatus with metalloids such as boron, arsenic, antimony and bismuth. In all cases, however, it has been necessary to exclude iron, nickel and cobalt, because these to a great extent favour the splitting of the hydrocarbons into carbon and hydrogen and so injuriously affect or prevent the formation of liquid hydrocarbons or give rise to stoppage of the apparatus.

If it is desired to employ metals having a favourable action such as tin, lead, molybdenum, tungsten and chromium in the form of coatings on the parts of the apparatus, in many cases difficulty is encountered in coating the parts of the apparatus uniformly and efficiently with the said substances.

I have now found that coatings on the parts of the apparatus coming into contact with the hot reaction materials, which coatings have an extremely favourable action for the thermal treatment of carbon compounds, as for example of hydrocarbons, are obtained by preparing the said coatings by the decomposition of volatile metal compounds, in particular those containing carbon. As metal compounds of the said kind may be mentioned for example carbonyls and metal alkyls, as for example molybdenum carbonyl and lead tetra-ethyl. Volatile inorganic metal compounds, as for example chromyl chloride, may also be employed. For example by leading the said compounds at a temperature above their decomposition temperature through, for example, metal tubes, uniform, stable, lustrous coatings are obtained which prevent or strongly suppress the deposition of carbon; even when employing tubes which have been treated in the said manner with iron carbonyl, no, or at the most, small amounts of carbon are deposited.

The substrata for the coatings may be of any metal stable at the temperature employed in the reactions covered, as for example copper, iron, ordinary steel, special steels or iron-free alloys, such as that known in the trade as "Monel" metal, brass and bronze. Gases or other vapours, as for example oxides of carbon, hydrogen, nitrogen or industrial gas mixtures such as watergas or mixed gas, may also be added to the volatile metal compounds serving for the preparation of the coatings. In this way, only comparatively small amounts of volatile metal compounds are necessary in order to obtain uniform, efficient coatings.

Catalysts may also be employed in the reactions concerned. In cases when the coatings themselves are catalytically active, porous masses, Raschig rings or the like may be introduced into the reaction vessel and provided with the same coating as the walls of the apparatus.

Apparatus the parts of which coming into contact with the hot reacting materials are coated by the process according to the present invention with metals, as for example with molybdenum or chromium, have the advantage as compared with apparatus coated by other methods, as for example electrolytically or by ceramic methods or by spreading dispersions of said metals on the surfaces that they are considerably more durable. The surfaces produced by decomposition of volatile metal compounds, especially of those containing carbon, are polished as a mirror so that inconvenient catalytic influences are prevented. Furthermore the coatings are very rigidly adhering even in very thin layers. Again they are stable to the high temperatures necessary for the thermal treatment of the materials comprising hydrocarbons.

The following examples will further illustrate the nature of this invention but the invention is not restricted to these examples.

Example 1

A tube constructed of the steel known in the trade as "V2A-steel" (which, as is known, contains 72 per cent of iron, 7 per cent of nickel and 20 per cent of chromium) and having an internal diameter of 15 millimetres is heated to 400° C. for 3 hours while a stream of carbon monoxide to which has been added a little molybdenum carbonyl is led therethrough. A homogeneous, thin, lustrous coating of metallic molybdenum is formed within the tube.

96 per cent ethylene is led in a stream at the rate of 20 liters per hour through the said tube at 780° C., the heated length of the tube being 60 centimetres.

From each busic metre of ethylene by a single passage through the tube, 240 grams of a liquid condensate containing 68 per cent of constituents boiling up to 200° C. (mainly benzene) are obtained and also 1.2 cubic metres of final gas having the following composition:—70.2 per cent of unchanged $C_2H_4$, 2.0 per cent of CO, 9.2 per cent of $H_2$, 15.4 per cent of $CH_4$ and 3.2 per cent of $N_2$. After using the tube for 120 hours there is still no deposition of carbon while an untreated tube becomes clogged with amorphous carbon after one hour under the same conditions.

Example 2

A tube similar to that used in Example 1 is treated at 200° C. with a stream of carbon monoxide to which a little iron carbonyl has been added. A thin, homogeneous, lustrous coating of iron is produced therein.

A gas mixture containing mainly homologues of methane and having the following composition:—

| | Per cent |
|---|---|
| $CH_4$ | 8.0 |
| $C_2H_6$ | 14.2 |
| $C_3H_8$ | 51.9 |
| $C_4H_{10}$ | 11.9 |
| $C_2H_4$ | 4.4 |
| $C_3H_6$ | 4.8 |
| $C_4H_8$ | 1.0 |
| $H_2$ | 1.4 |
| $N_2$ | 2.4 | is led at a speed of 20 liters per hours through the said tube at 850° C., the heated length of the tube being 60 centimeters.

From each cubic metre of initial gas by a single passage through the tube, 170 grams of a liquid condensate (80 per cent of constituents boiling up to 200° C. and mainly consisting of benzene) are obtained and also 1.5 cubic metres of a final gas having the following composition:—

| | Per cent |
|---|---|
| $C_3H_6$ and $C_4H_8$ | 1.6 |
| $C_2H_4$ | 33.8 |
| $H_2$ | 24.8 |
| $C_nH_{2n+2}$ ($n=1.15$) | 38.4 |
| $N_2$ | 1.4 |

After using the tube for 45 hours, there is still no deposition of carbon, while under the same conditions both ordinary iron and V2A-steel having the composition referred to in Example 1 cause an extensive deposition of amorphous carbon.

Example 3

A tube similar to that employed in Example 1 is treated at 800° C. for two hours with a stream of hydrogen to which has been added a little chromyl chloride.

96 per cent ethylene is led at the rate of 20 liters per hour at 780° C. through the said tube, the heated length of the tube being 60 centimeters.

From each cubic meter of ethylene by a single passage through the tube, 200 grams of liquid condensate containing 55 per cent of constituents boiling up to 100° C. and 71 per cent boiling up to 200° C. (mainly benzene) are obtained and also about 1.2 cubic meters of final gas having the following composition:—

| | Per cent |
|---|---|
| Unchanged $C_2H_4$ | 69.8 |
| CO | 1.0 |
| $H_2$ | 10.0 |
| $CH_4$ | 18.0 |
| $N_2$ | 1.2 |

After using the tube for 80 hours it is still free from injurious deposits of carbon.

Example 4

100 cubic metres of a Columbia oil distillate boiling between 150° and 300° C. are allowed to drop at the rate of 100 cubic metres per hour through a vertical tube of V2A-steel having the composition referred to in Example 1 which has been treated as described in Example 1 and which is heated to 380° C., the internal diameter of the tube being 15 millimetres and the heated length thereof 60 centimetres. The vaporized fraction of the oil may be withdrawn from the top of the tube and condensed while the remaining fraction collects in a receiver at the lower end of the tube. 59 per cent of the oil employed is obtained as a distillate having a boiling point of from 120° to 200° C. and 38 per cent of the oil as a residue boiling between 200° and 300° C. After using the tube for 50 hours, only traces of carbon deposition can be detected in the tube.

Example 5

A hydrocarbon mixture obtained by distilling 1 kilogram in 24 hours of a fraction boiling between 200° and 320° C. of a Panhandle oil in a stream of 15 liters per hour of methane is passed through a tube of V2A-steel having the composition referred to in Example 1 which has an internal diameter of 15 millimetres, is externally heated to 620° C. within a length of 80 centimetres and has been coated with molybdenum as described in Example 1. In this manner 600 litres of gas are obtained within 24 hours having the following composition:—

| | Per cent by volume |
|---|---|
| Propane and butane | 5.8 |
| Ethane | 12.0 |
| Hydrogen | 12.0 |
| Methane | 67.2 |
| Nitrogen | 3.0 |

In addition thereto 760 grams of an oil, containing 20 per cent of hydrocarbons boiling up to 200° C. which are mainly of aromatic nature, are added.

After 24 hours of operation the tube shows no injurious deposition of carbon.

If the said treatment is carried out at 450° C. under a pressure of 100 atmospheres and in the presence of hydrogen instead of methane a partial hydrogenation of the resulting unsaturated compounds takes place. Also in this case no injurious deposition of carbon is observed.

What I claim is:—

1. In the thermal treatment of fluid hydrocarbons under carbon forming conditions, the step of heating said hydrocarbons in a vessel having metallic walls lined with a metal coating which is prepared by decomposing within the body of the vessel a vaporized compound of said metal, whereby the formation of carbon in such thermal treatment is substantially lessened.

2. In the thermal treatment of gaseous hydrocarbons to produce higher boiling liquid hydrocarbons, the step of heating said gaseous hydrocarbons in a vessel having metallic walls and having a metal coating which is prepared by decomposing within the body of the vessel a volatile compound of said metal.

PAUL FEILER.